United States Patent [19]

Pierini et al.

[11] Patent Number: 4,867,762

[45] Date of Patent: Sep. 19, 1989

[54] METHOD AND A DEVICE FOR PURIFYING A GAS CONTAINING HYDROGEN ISOTOPES

[75] Inventors: Giancarlo Pierini, Varese; Heinz Dworschak, Cardana Di Besozzo; Bruno Spelta, Varese; Etienne Vansant, Zoersel, all of Italy

[73] Assignee: European Atomic Energy Community (EURATOM), Luxembourg

[21] Appl. No.: 200,148

[22] Filed: May 26, 1988

[30] Foreign Application Priority Data

May 27, 1987 [LU] Luxembourg .............................. 86902

[51] Int. Cl.$^4$ ............................................. B01D 53/04
[52] U.S. Cl. ........................................... 55/31; 55/33; 55/66; 55/67; 55/73; 55/75; 55/179; 55/389
[58] Field of Search ................. 55/31, 33, 66–68, 55/74, 75, 62, 179, 387, 389, 71–73

[56] References Cited

U.S. PATENT DOCUMENTS

| | | | |
|---|---|---|---|
| 3,024,868 | 3/1962 | Milton | 55/33 |
| 3,150,942 | 9/1964 | Vasan | 55/31 |
| 4,248,607 | 2/1981 | Folkers | 55/33 |
| 4,314,828 | 2/1982 | Saito et al. | 55/33 X |
| 4,369,048 | 1/1983 | Pence | 55/66 |
| 4,444,572 | 4/1984 | Avon et al. | 55/66 X |
| 4,447,353 | 5/1984 | Pence et al. | 55/66 X |
| 4,469,496 | 9/1984 | Frischmuth et al. | 55/67 X |
| 4,583,997 | 4/1986 | Staudigl | 55/31 |
| 4,732,581 | 3/1988 | Cheh et al. | 55/67 |
| 4,732,596 | 3/1988 | Nicholas et al. | 55/68 X |

FOREIGN PATENT DOCUMENTS

| | | |
|---|---|---|
| 0049936 | 5/1981 | European Pat. Off. . |
| 0199854 | 5/1986 | European Pat. Off. . |
| 0189606 | 6/1986 | European Pat. Off. . |
| 0189607 | 6/1986 | European Pat. Off. . |

Primary Examiner—Robert Spitzer
Attorney, Agent, or Firm—Sughrue, Mion, Zinn, Macpeak & Seas

[57] ABSTRACT

The invention concerns a method and a device for purifying a gas containing hydrogen isotopes, and for recovering the different isotopes, in particular for treating a gas coming from a thermonuclear fusion reactor. According to the invention, the gas is firstly dried in a water and $CO_2$ adsorption stage (2), the dried gas then passes through a stage (3) in which a selective adsorption of sulphur compounds takes place and finally, the gas leaving this stage, which still contains at least some of the compounds $(H,D,T)_2$, $N_2$, $O_2$, CO, $C(H,D,T)_4$, is processed in a hydrogen adsorption/separation stage (4) of the zeolite type.

5 Claims, 1 Drawing Sheet

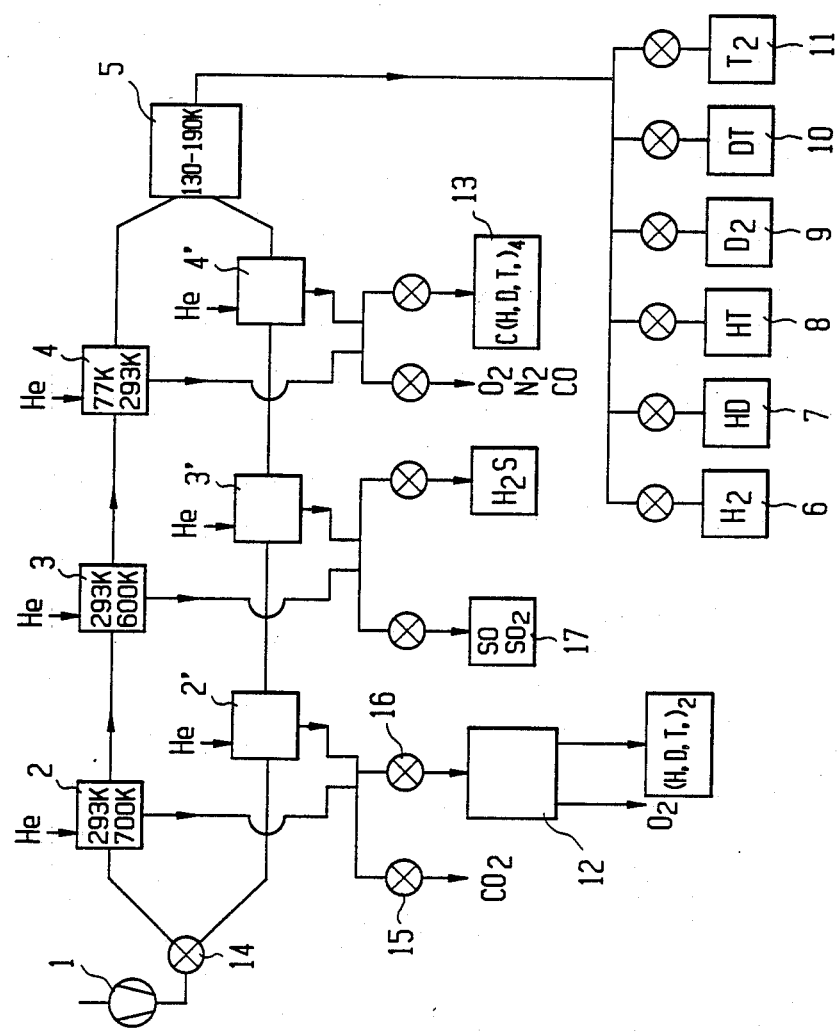

METHOD AND A DEVICE FOR PURIFYING A GAS CONTAINING HYDROGEN ISOTOPES

FIELD OF THE INVENTION

The invention concerns a method for purifying a gas containing hydrogen isotopes, this method allowing to recover the different isotopes and being conceived in particular for the treatment of a gas coming from a thermonuclear fusion reactor.

BACKGROUND OF THE INVENTION

It is known that a fusion reactor does not only produce helium and energy from the fusion of deuterium (D) and tritium (T), but also certain impurities resulting in particular from the reaction of the plasma with the first wall or any other reactor component. It is thus necessary to withdraw this gas from the plasma at regular periods and to purify it. The gas can be contaminated by a great number of impurities. In combination with light water, heavy water or tritiated water, these impurities may consist of sulphur compounds such as SO, $SO_2$, $(H,D,T)_2S$, tritiated hydrocarbides such as $C_n(H,D,T)_{2n+m}$, mainly methane, as well as $N_2$, $O_2$, CO, $CO_2$.

The purification methods known until now and described for example in the report "Los Alamos 6855-P" by J. L. Anderson and R. H. Sherman, in June 1977, entitled "Tritium System Test Assembly", are fairly complicated and expensive and require in certain subsystems a rise of the temperature of the gas containing the tritium up to values at which the tritium migrates into the metals of the apparatus and passes therethrough due to its permeation capacity.

The invention provides for a simpler method which does not imploy high temperatures for the tritiated gases and which may be realised in a simple and compact device. This latter feature is well appreciated for reasons of security and of reducing the quantity of radioactive material present in the device. It further results therefrom that only a simple, small and cheap system of dynamic confinement is necessary for the normal or abnormal purification conditions, due to the reduced space necessary for its operation. This reduces considerably the costs of investment and renders economic the extraction and the processing of the plasma.

SUMMARY OF THE INVENTION

According to the invention, this aim is achieved by the fact that firstly the gas is dried in a water adsorption stage, that the dried gas then passes through a stage in which sulphur compounds are selectively adsorbed and that finally the gas leaving this stage and still containing some of the compounds $(H,D,T)_2$, $N_2$, $O_2$, CO, $C(H,D,T)_4$ is processed in a hydrogen adsorption/separation stage of the zeolite type.

Preferably, the water which is adsorbed in the water adsorption stage is then divided into oxygen $O_2$ on the one hand and hydrogen and its isotopes on the other hand, the latter being then processed in a hydrogen adsorption/separation stage of the zeolite type.

It is useful to operate the different stages in an alternate fashion, i.e. that an adsorption cycle is followed by a regeneration cycle in which the adsorbed products are released and the zeolites are regenerated.

The invention further concerns a device for purifying a gas containing hydrogen isotopes according to the method defined above. In this device, each adsorption stage referred to above includes two identical units which operate alternatively in the adsorption cycle and in the regeneration cycle. Such a device can thus operate in a quasi continuous manner.

DETAILED DESCRIPTION OF THE INVENTION

The invention will now be described in detail by means of a preferred embodiment and of the enclosed drawing, which shows schematically a purification device according to the invention.

This embodiment has been conceived on the basis of a fusion reactor of the following characteristics:

| | | |
|---|---|---|
| maximum fusion power | 747 MW (th) | |
| activity/inactivity ratio | 0,8 | |
| fuel inventory | 3041 gd$^{-1}$ | (25,3 mol/h) |
| quantity of rejected tritium | 1733 gd$^{-1}$ | } (24 mol/h) |
| quantity of rejected deuterium | 1156 gd$^{-1}$ | |

Table I shows in its first column the composition of the gas to be purified in the case of a reactor having the above specified features. As no fusion reactor has been operated until now, this composition is the result of a theoretical consideration and may be modified without affecting the spirit of the method and the substance of the device according to the invention.

In the second column, the quantity of the different compounds (in liters per hour), and in the third column, the radioactivity of the different compounds is indicated.

The gas mixture composed of hydrogen isotopes, of helium and of impurities, such as it is discharged from the fusion reactor, is injected by a dosimetric pump 1 into a water adsorption and $CO_2$ adsorption stage 2 which adsorbs practically the entire vapours of light water, heavy water and tritiated water, the total quantity of $CO_2$ and some traces of CO. The adsorption temperature is maintained constant at ambient temperature. The fourth column of table I indicates the composition of the gas after having passed through the first stage 2. The remaining mixture is then applied to an adsorption stage 3 which selectively adsorbs sulphur compounds such as SO, $SO_2$, $H_2S$ at ambient temperature. This stage contains a zeolite which is mainly impregnated by monoethanolamine and diethanolamine (see for example the European patent document EP-A-85200128.8). This substrate can be replaced by a preconditioned zeolite of the type A, Y or X, in which the cations are interchanged with $Ca^{2+}$, $Mg^{2+}$, $Fe^{3+}$; such a zeolite further adsorbs sulphur compounds and traces of $CO_2$ which still subsist after the preceding stage. The last column of the table shows the composition of the gas at the outlet of the stage 3. It can be seen that the sulphur compounds have practically disappeared.

The gas at the outlet of stage 3 still contains helium, the isotopes of hydrogen, $N_2$, $O_2$, CO, $C(H,D,T)_4$, and is fed into stage 4 which is a hydrogen adsorption/separation stage of the zeolite type in which all the compounds except helium are completely adsorbed at the temperature of liquid nitrogen (77K). The material of adsorption is a zeolite of the mordenite type which has been structurally modified (see for example the European patent document EP-A-0 049 936) and which is capable to adsorb the six isotopomeric species of hydrogen ($H_2$, HD, HT, $D_2$, DT, $T_2$) (see European patent application 85200129.6). This zeolite is coated with alumina or clay at a rate of between 5 and 50% by weight in order to increase its mechanical properties.

TABLE I

| (1) Compounds | (2) Initial State quantity $l \cdot h^{-1}$ | (3) activity $Ci \cdot h^{-1}$ | (4) quantity at the outlet of stage 2 $l \cdot h^{-1}$ | (5) quantity at the outlet of stage 3 $l \cdot h^{-1}$ |
|---|---|---|---|---|
| D—H | 578 | 155 | 578 | 578 |
| H | 14,45 | — | 14,45 | 14,45 |
| $(H,D,T)_2O$ | 9,6 | 0,61 | $<9,5 \cdot 10^{-6}$ | — |
| $C(H,D,T)_4$ | 0,64 | 0,078 | 0,64 | 0,64 |
| $(H,D,T)_2S$ | 0,064 | $7,8 \cdot 10^{-3}$ | 0,064 | — |
| $SO, SO_2$ | 0,96 | — | 0,96 | — |
| $N_2, O_2$ | 6,4 | — | 6,4 | 6,4 |
| CO | 0,64 | — | 0,64 | 0,64 |
| $CO_2$ | 0,064 | — | 0,064 | — |
| $^4He$ | 29 | — | >>29 | >>29 |

The most powerful substrate is (Ca,Na)-mordenite having 70% of Ca, and being thermally preconditioned between 420° and 480° C. for 48 hours, the temperature being selected at a speed of 2° C./min.

Table II contains the resolution faction ($R_F$), the separation factor ($S_F$) and the retention time ($TH_2$) for $H_2$ and the retention time ($TD_2$) for $D_2$ relating to an optimum performance of the stage based either on Na-mordenite, or on (Ca,Na)-mordenite. The carrier gas flow rate (helium) is about 40 cm$^3$min$^-$.

TABLE II

| Zeolite | Temp. (°C.) | $TH_2$ (min) | $TD_2$ (min) | $S_F$ | $R_F$ |
|---|---|---|---|---|---|
| Na—mordenite | 155 | 3,2 | 3,7 | 1,16 | 1,8 |
| Na—mordenite | 140 | 4,6 | 5,5 | 1,19 | 2,0 |
| (Ca,Na)—mord. | 55 | 3,8 | 4,6 | 1,22 | 2,6 |
| (Ca,Na)—mord. | 40 | 6,5 | 8,5 | 1,30 | 3,3 |

The adsorption is continued up to a saturation rate of about 80% of the total adsorption value. During this adsorption, a first distribution of the isotopomeric species is performed in this stage. Thereafter, the zeolite of stage 4 is heated up to a temperature between 150 and 170K., depending on the type of zeolite. The hydrogen isotopes are then separated from the other impurities which remain adsorbed in the zeolite at these temperatures.

The preliminary separation of the hydrogen isotopes obtained by the displacement phenomenon in stage 4 is completed in a stage 5 of a structure identical to that of stage 4. However, the zeolite of this stage is maintained at a constant temperature between 130 and 190K., preferably below 160 K. This stage is operated according to the chromatographic technique in gaseous phase. A clear separation between the six isotopomeric species is obtained rapidly, even if the saturation rate in stage 4 reaches 80% of the maximum value. This value can be modified in accordance with the isotopic hydrogen composition and with the required saturation rate.

The regeneration of the zeolite can be performed as soon as a given saturation value is attained, in order to recover the adsorbed tritiated and non-tritiated components. This is true for tritiated water and $CO_2$ in stage 2, for sulphur compounds in stage 3, for $O_2$, $N_2$, CO and $C_n(H,D,T)_{2n+m}$ in stage 4. Valves such as 15 and 16 direct the products selectively either towards an exhaust chimney or towards traps or recipients such as 17.

The isotopes are identified at the outlet of stage 5 in mass and radioactivity detectors and can thus be directed successively and in the following order towards a hydrogen trap 6, a H-D trap 7, a H-T trap 8, a $D_2$ trap 9, a D-T trap 10 and a $T_2$ trap 11. These traps are adsorption traps of the getter type.

During this operation, the other impurities remain attached to the zeolite of stage 4, but are released therefrom one by one, if the zeolite is heated up to ambient temperature. This release can be speeded up by sweeping the zeolite with helium.

All the non-tritiated compounds such as $O_2$, $N_2$, CO, $CO_2$, can be directed to the chimney, whereas the tritiated hydrocarbides $C_n(H,D,T)_{2n+m}$, mainly methane, are directed to a methane trap 13, which is constituted by a metallic adsorption bed maintained at a temperature of 600K., at which the hydrocarbon compounds are decomposed. The regeneration of this bed is realised by heating it up to 1000K., in order to recover the hydrogen isotopes. The duration of a complete cycle of adsorption/desorption-separation is about one hour. In this case, two units, 2, 3, 4 and 2', 3', 4' respectively, can be branched in parallel and can be operated alternatively through a valve 14.

The water adsorbed in stage 2 can be repelled from this stage during a regeneration cycle by heating it to 700K. and by sweeping with helium. The water thus rejected is divided into oxygen on the one hand and into the hydrogen isotopes on the other hand in a separation stage 12 operating on a chemical or electrochemical basis; the oxygen may then be withdrawn, whereas the hydrogen isotopes should again be separated either in stage 4 or in a separate stage of similar structure.

Stage 2 is actually composed of two water traps in series, the first one being equipped with a preconditioned zeolite which allows only a small quantity of water to pass therethrough (below 5 ppm), whereas the second trap is equipped with a silicate which has been modified by silane or borane, such as described in the European patent application No. 85200678.2. The water vapour content at the output of this trap is below 0.5 ppm.

The size of each stage and the operation time prior to regeneration as well as the time necessary for the regeneration and for the chromatographic separation of the gases are indicated by way of example in table III.

TABLE III

| Stage | Diameter (cm) | Height (cm) | Time prior to regeneration (days) | Time of regeneration (R) or separation (S) (min) | Remarks | Quantity of zeolite (g) |
|---|---|---|---|---|---|---|
| 2 | 10 | 100 | 3 | 120 (R) | regeneration at 700K in a flow of He (2 columns used) | 7000 |
| 3 | 10 | 100 | 20 | 15 (R) | regeneration at 500K in | 7000 |

TABLE III-continued

| Stage | Diameter (cm) | Height (cm) | Time prior to regeneration (days) | Time of regeneration (R) or separation (S) (min) | Remarks | Quantity of zeolite (g) |
|---|---|---|---|---|---|---|
| 4 | 5 | 200 | 1 | 15 (R + S) | a flow of He (2 columns used) regeneration at 273–323K in a flow of He of 20 l/min (2 columns used) | 3200 |
| 5 | 10.0 | 250 | / | 15 (S) | (2 columns used) | 4000 |

The invention is not restricted to the embodiment described in detail. The method according to the invention can, on the contrary, be applied to any extraction of tritium from an inert gas flow such as helium or another gas.

We claim:

1. A method for purifying a gas coming from a thermonuclear fusion reacter containing hydrogen isotopes and for recovering different isotopes therefrom, said method comprising the steps of: firstly drying said gas in a water and $CO_2$ adsorption stage (2), passing the dried gas through an adsorption stage (3) for selectively adsorbing sulphur compounds, and processing the gas leaving stage (3) and containing at least one component of the group consisting of $(H,D,T)_2$, $N_2$, $O_2$, CO, $C(H,D,T)_4$, in a hydrogen adsorption-separation stage (4) of the zeolite type.

2. A method according to claim 1, further comprising the steps of splitting the water adsorbed in the water adsorption stage (2) into oxygen ($O_2$) and hydrogen and its isotopes, and then processing the hydrogen and its isotopes in said adsorption/separation stage (4) of the zeolite type.

3. A method according to claim 2, further comprising the step of regenerating the zeolite alternating with processing the hydrogen and its isotopes in said hydrogen adsorption-separation stage (4) of the zeolite type, and rejecting the adsorbed product.

4. A method according to claim 1, further comprising the step of alternately regenerating the zeolite in stages operated according to alternate cycles, i.e., an adsorption cycle followed by a regeneration cycle, and processing the hydrogen and its isotopes in said adsorption cycle, and rejecting the adsorbed product during the regeneration cycle.

5. A device for purifying a gas containing hydrogen isotopes, said device comprising a dosimetric pump for discharging a gas mixture composed of hydrogen isotopes, helium and of impurities from a fusion reaction, a first, water and $CO_2$ adsorption stage which adsorbs practically the entire vapors of light water, heavy water and tritiated water, the total quantity of $CO_2$ and some traces of CO, a second adsorption stage of the zeolite type for selectively adsorbing sulfur compounds at ambient temperature, a third, hydrogen adsorption/separation stage of the zeolite type, a first line connecting said first, second and third adsorption stages in series, and defining a first processing unit, identical first, second and third adsorption stages, a second line series connecting said identical first, second and third adsorption stages and forming a second processing unit, a valve connecting said first and second lines to said pump downstream of said pump and upstream of said first stages of respective units for selective operation of said identical units alternately in adsorption and regeneration cycles such that the gas coming from said pump may be dried in a first water and $CO_2$ adsorption stage, the sulfur compounds selectively adsorbed in the second stage from the dried gas, and the hydrogen adsorbed from the gas leaving the second stage in said third stage of one of said units while the other unit has the zeolite thereof regenerated.

* * * * *